Aug. 22, 1961

Z. J. LANSKY ET AL 2,997,318

SEALING RINGS FOR RODS AND SHAFTS

Filed Aug. 1, 1957

INVENTORS
Zdenek J. Lansky
Martin T. Mulroy
BY
Ooms, McDougall, Williams & Hersh
Attorneys

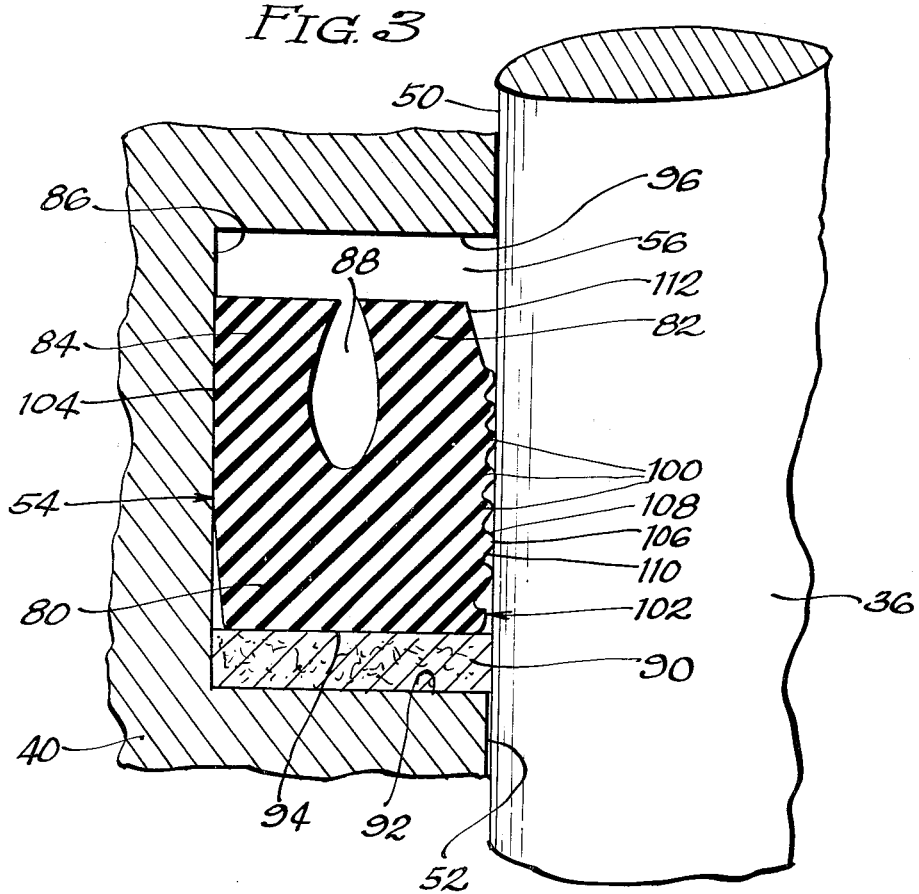
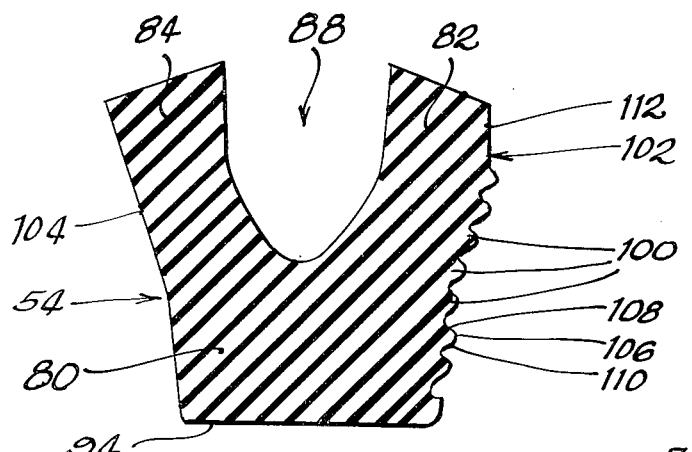

United States Patent Office 2,997,318
Patented Aug. 22, 1961

2,997,318
SEALING RINGS FOR RODS AND SHAFTS
Zdenek J. Lansky, North Riverside, and Martin T. Mulroy, Des Plaines, Ill., assignors to Parker-Hannifin Corporation, a corporation of Ohio
Filed Aug. 1, 1957, Ser. No. 675,643
2 Claims. (Cl. 286—12)

This invention relates to rings adapted to form fluid seals between cylindrical members which are relatively rotatable or relatively movable in an axial direction.

One object is to provide a new and improved sealing ring which forms a perfect pressure seal and which also is highly effective to wipe fluid off a moving cylindrical member such as a rod or shaft, to prevent the rod from carrying fluid past the sealing ring.

A further object is to provide a new and improved sealing ring which may be employed to great advantage for wiping hydraulic fluid off the piston rod of a hydraulic cylinder, so as to prevent the rod from carrying a thin film of hydraulic fluid past the sealing ring.

Another object is to provide a new and improved sealing and wiping ring which is so efficient that the piston rod of a hydraulic cylinder may be wiped dry under even the most unfavorable conditions.

Further objects and advantages of the present invention will appear from the following description taken with the accompanying drawings in which:

FIG. 3 is a fragmentary longitudinal sectional view, on a still larger scale, to show one of the sealing rings of FIGS. 1 and 2.

FIG. 4 is a cross sectional view of the sealing ring of FIG. 3, with the ring in a free state.

Figures 1, 2:
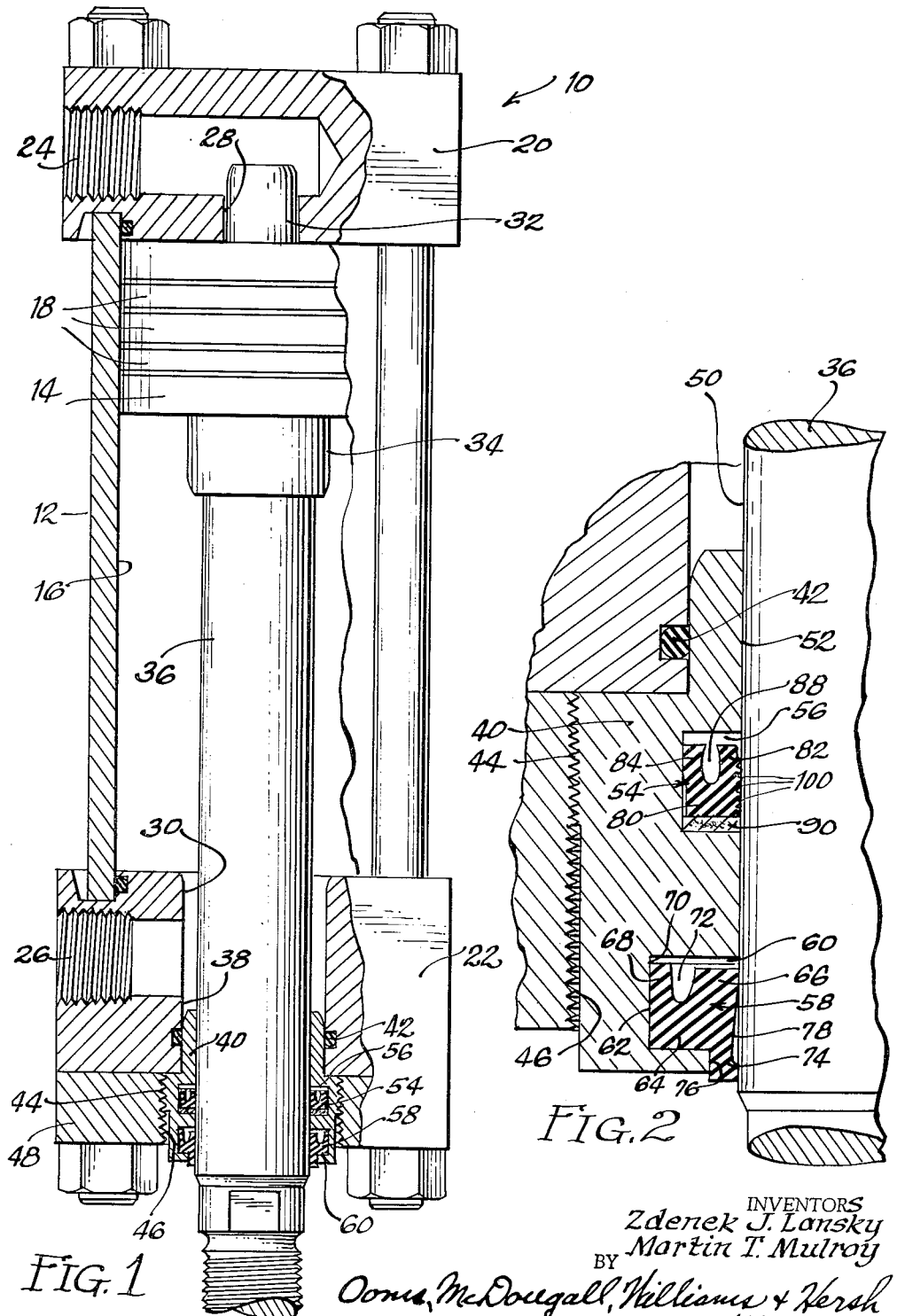
FIG. 1 is an elevational view, partly in central longitudinal section, of a hydraulic cylinder having a sealing arrangement to be described as an illustrative embodiment of the present invention.
FIG. 2 is a fragmentary enlarged longitudinal sectional view of the sealing arrangement shown in FIG. 1.

As already indicated, FIG. 1 shows a hydraulic power device 10 comprising a cylinder 12 having a piston 14 movable therein, the cylinder 12 being formed with a smooth cylindrical bore 16 for receiving the piston. Suitable sealing rings 18 are mounted on the piston 14 to prevent the passage of hydraulic fluid past the piston. The cylinder 12 is closed at its opposite ends by heads 20 and 22 having internally threaded openings 24 and 26 therein for supplying hydraulic fluid to the opposite ends of the bore 16. Axial ports 28 and 30 lead between the openings 24 and 26 and the opposite ends of the bore 16. It will be seen that the opposite ends of the piston 14 are provided with generally cylindrical cushion spears 32 and 34 which are adapted to enter into and fit closely within the ports 28 and 30 so as to obstruct the outflow of hydraulic fluid as the piston approaches the ends of the cylinder 12. In this way, the partially trapped hydraulic fluid in the ends of the cylinder forms cushions to retard the piston and prevent it from banging against the cylinder heads 20 and 22.

The piston 14 is connected to a piston rod 36 which extends externally of the cylinder 12 through the cylinder head 22. Thus, the port 30 is only one portion of a bore 38 which extends entirely through the head 22. To support the piston rod 36 and a seal therefor, a bearing or gland 40 is disposed in the outer end of the bore 38, with an O-ring type of seal 42 therebetween, to prevent leakage of hydraulic fluid between the gland 40 and the head 22. It will be seen that the gland 40 has external threads 44 which are screwed into an internally threaded bore 46 in a plate 48 secured to the lower end of the head 22.

The piston rod 36 has a smooth cylindrical outer surface 50 which is slidably engaged with a smooth cylindrical bore 52 formed in the gland or bearing 40. To prevent leakage of hydraulic fluid between the rod 36 and the gland 40, a soft resilient sealing ring 54 is mounted in an annular groove 56 formed in the gland 40 along the bore 52. As disclosed and claimed in the copending application of Otto J. Maha, Serial No. 438,381, filed June 22, 1954, now Patent No. 2,907,596, a secondary sealing ring 58 is also provided to insure that the emerging rod will be wiped dry, and to wipe off any dust or other foreign matter from the piston rod as it is withdrawn into the cylinder during use. The secondary sealing ring 58 is mounted in a second anular groove 60 formed in the gland 40 along the bore 52, the groove 60 being spaced toward the outer end of the gland from the first groove 56.

As disclosed and claimed in the above mentioned Maha application, the secondary sealing ring 58 has a generally V-shaped body 62 provided with a generally rectangular base portion 64. Inner and outer lips 66 and 68 extend laterally from the base portion 64. When the soft resilient ring 58 is in a free state, the lips 66 and 68 diverge or flare from each other, but they are compressed toward each other, between the rod 36 and the gland 40, when the ring is in its position of use. It will be seen that the groove 60 is substantially rectangular in cross section and is formed with a cylindrical bottom surface 70 for engagement by the outer lip 68. An annular, laterally opening channel 72 is formed between the lips 66 and 68 so that fluid pressure will tend to spread the lips forcefully against the rod 36 and the gland 40.

To wipe dirt and other foreign matter off the rod 36, the secondary sealing ring 58 has a second inner lip 74 which projects from the base portion 64 in the opposite direction from the first inner lip 66. As shown, the second inner lip 74 extends outwardly of the gland 40 through an annular slot 76 which communicates with the lower side of the groove 60. An arching internally relieved surface 78 is formed between the inner lips 66 and 74 so that the lips will firmly engage the rod 36. Reference may be had to the above identified Maha application for further details of the secondary seal 58 and the cooperative arrangement between the primary and secondary seals 54 and 58.

It will be seen that the primary sealing ring 54 is generally V-shaped in cross section and is formed with a generally rectangular base portion 80 on one side of the ring 54. Inner and outer lips 82 and 84 project laterally in the opposite direction from the base portion 80. The groove 56 for the ring 54 is shown as being substantially rectangular in cross section, and thus is formed with a cylindrical bottom surface 86 for engagement by the outer lip 84. An annular channel or groove 88 is formed between the lips 82 and 84 so that fluid pressure will tend to spread the lips forcefully against the rod 36 and the gland 40.

The sealing ring 54 may be made of synthetic rubber or other suitable moderately soft resilient material. To prevent the lower inner corner of the sealing ring 54 from being extruded between the rod 36 and the bore 52, by the combined action of fluid pressure and the outward movement of the rod, a back up washer 90 is interposed between the base portion 80 of the sealing ring and the lower side 92 of the groove 56. The base portion 80 has a flat bottom surface 94 which engages the washer 90. It will be seen that the washer 90 is simply disk-like in form. The washer 90 may be made of fibrous material such as leather, or other suitable material which will not extrude between the rod and the bore.

It will be seen that the groove 56 has an upper side surface 96 which is spaced above the upper ends of the lips 82 and 84. In this way, hydraulic fluid may readily enter the channel 88 between the lips. Due to the spreading action of fluid pressure on the lips 82 and 84, the sealing ring 54 forms a perfect pressure seal between the rod 36 and the gland 40.

Even with a perfect pressure seal, there is a tendency for hydraulic fluid to adhere to the rod 36, with the result that the rod tends to carry a thin film of hydraulic fluid past the sealing ring 54. Under most conditions, the secondary seal 58 will wipe this film of hydraulic fluid off the rod. Eventually, the wiped fluid will be returned to the cylinder past the sealing ring 54. However, with prior constructions, it has been found that under certain highly adverse conditions the wiped hydraulic fluid may tend to accumulate to such an extent between the primary and secondary sealing rings 54 and 58 that some hydraulic fluid will be carried past the secondary seal 58 by the rod 36, so that the emerging rod will not be strictly dry. This is particularly true when the rod extends vertically and downwardly from the cylinder.

However, the illustrated primary sealing ring 54 is arranged to wipe practically all hydraulic fluid off the rod 36 so that the secondary seal 58 will have very little or no hydraulic fluid to wipe off the rod. With the present primary seal 54, the wipeage never accumulates to any objectionable extent between the sealing rings 54 and 58, even under the most adverse conditions. Any wipeage that may accumulate is returned to the cylinder past the primary seal 54 before the rod can carry any fluid past the secondary seal 58. Thus, the emerging rod is always kept dry so that dust and other foreign material will not adhere to the rod.

Thus, the illustrated primary sealing ring 54 is formed with a plurality of annular ridges 100 adapted to engage the rod 36 and to wipe hydraulic fluid off the rod. The ridges 100 are distributed along the base portion 80 and the inner lip 82 at the inside of the ring 54. More specifically, the ring 54 has inner and outer diverging or flaring surfaces 102 and 104 which extend along the inner and outer lips 82 and 84. The ridges 100 are formed on the innersurface 102 and are adapted to engage the movable rod 36, while the outer surface 104 is adapted to engage the bottom surface 86 of the groove 56 in the stationary gland 40. When the sealing ring 54 is in a free state, the inner surface 104 angles inwardly from the base portion 80, as shown in FIG. 4, but when the ring is in its position of use, the lips 82 and 84 are compressed toward each other so that several of the ridges 100 will engage the rod 36.

It will be seen that each of the ridges 100 has an inwardly projecting crest 106 which is adapted to engage the smooth outer surface 50 on the rod 36. The illustrated crests 106 are slightly rounded. On the opposite side of the crest 106, each ridge 100 has upper and lower sloping sides 108 and 110. The ridges 100 are generally saw-toothed in cross section. Thus, the outer side 108 of each ridge is more steeply sloping than the lower side 110. In other words, the side of each ridge which is more remote from the base portion 80 is more steeply sloping than the other side of the ridge.

At the extreme outer end of the inner lip 82, the inner surface 102 has a portion 112 which is recessed away from the ridge 36 so that the ridge 100 which is closest to the end of the inner lip 82 will project farther in the direction of the rod than any other point along the surface 102. In this way, the recessed end portion 112 of the lip 82 is always clear of the rod 36, as shown in FIG. 3. This insures that the ridges 100 will engage the rod 36 with maximum, undiminished force, so that the ridges will effectively wipe virtually all hydraulic fluid off the rod 36.

Along the inner lip 82, the inside diameter of the sealing ring 54 is substantially less than the diameter of the rod 36, so that the ring must be stretched or tensioned to fit around the rod. In other words, the inner lip must be displaced outwardly, as shown in FIG. 3. The tension in the ring 54 is taken up by the engagement of the ridges 100 with the rod, with the result that the wiping force between the ridges and the rod is quite great and is always sufficient to wipe virtually all fluid off the rod. One or more ridges are always in contact with the rod, with high unit pressure therebetween, so as to give shearing surfaces which are highly effective in wiping oil off the rod. With increasing fluid pressure on the ring, the area of contact with the rod shifts toward the solid section of the ring. With the additional wiping action of the secondary seal 58, the emerging rod is always virtually dry. Due to the shape and position of the lips 82 and 84 and the ridges 100, any fluid between the primary and secondary seals 54 and 58 is soon returned past the primary seal 54, before any great pressure can build up in the space between the seals. In other words, the shape and arrangement of the ridges 100 and the lips 82 and 84 are such that the ring 54 forms a one-way pressure seal, which effectively seals the cylinder against the escape of fluid under pressure, while permitting return of fluid to the cylinder from the space between the seals, with only slight fluid pressure.

The present sealing arrangement is highly effective under even the most adverse conditions. The emerging rod is wiped dry even when it extends downwardly from the cylinder. Thus, fluid never drips from the rod and is never even present in sufficient quantities to cause dirt to adhere to the rod. Nevertheless, the sealing arrangement is easy to manufacture and low in cost. The sealing rings may readily be molded, and virtually all of them will function perfectly.

Various modifications, alternative constructions and equivalents may be employed without departing from the true spirit and scope of the invention, as exemplified in the foregoing description and defined in the following claims.

We claim:

1. In a fluid power device, the combination comprising inner and outer telescopically engaged members, said inner member having a smooth external cylindrical surface, said outer member having an internal cylindrical surface slidably engaging said smooth cylindrical surface and formed with an annular groove of generally rectangular cross section, a soft resilient rubberlike ring of generally V-shaped cross section disposed in said groove and compressed between said members to form a seal therebetween, said ring being tightly stretched around said inner member, said ring having a base portion and first and second oppositely angling lips extending laterally from said base portion with a channel therebetween, said lips flaring away from each other when said ring is in a free state but being compressed toward each other when in position of use between said members, said ring having a radially inward surface extending along said base portion and said second lip, said radially inward surface being formed with a series of annular ridges extending around the inside of said second lip and engageable with said smooth cylindrical surface, said radially inward surface having an annularly recessed portion extending between the laterally outermost ridge of said series of ridges and the laterally outer end of said second lip, whereby said outermost ridge is spaced a substantial distance from said outer end of said second lip and is the first point of contact from said outer end with said smooth cylindrical surface, the angling of said second lip and the recessing of said recessed portion being effective to concentrate the elastic band pressure, due to initial stretching of said ring, at said outermost ridge, the remainder of said ridges having progressively decreasing initial pressure contact with said smooth cylindrical surface whereby fluid pressure within said channel tends to pivot said second lip about said outermost ridge so as to cause a further increase in the pressure contact between said outermost ridge and said smooth cylindrical surface.

2. A sealing ring for use between inner and outer radially spaced cylindrical surfaces of predetermined diameters, said ring being made of soft resilient rubberlike material stretchable over said inner cylindrical surface and having a generally V-shaped cross section with a base portion and first and second oppositely angling lips extending laterally from said base portion with a channel therebetween, the inside diameter of said ring being substantially smaller when said ring is in a free state than the outside diameter of said inner cylindrical surface, said ring having a radially inward surface extending along said base portion and said second lip, said radially inward surface being formed with a series of annular ridges extending around the inside of said second lip, said ridges in succession along said second lip outwardly of said base portion being of progressively decreasing diameters, said radially inward surface having an annularly recessed portion extending between the smallest of said ridges and the laterally outer end of said second lip, whereby said smallest ridge is spaced a substantial distance from said outer end of said second lip and is the first point of contact from said outer end with said inner cylindrical surface when said ring is stretched thereover, the angling of said second lip and the recessing of said recessed portion being effective to concentrate the elastic band pressure, due to stretching of said ring over said inner cylindrical surface, at said smallest ridge, the remainder of said ridges rearwardly of said smallest ridge having progressively decreasing initial pressure contact with said inner cylindrical surface when said ring is on said cylindrical surface whereby fluid pressure within said channel tends to pivot said second lip about said smallest ridge so as to cause a further increase in the pressure contact between said smallest ridge and said inner cylindrical surface.

References Cited in the file of this patent

UNITED STATES PATENTS

| | | |
|---|---|---|
| 2,182,034 | Peter-Franz Von Oberstadt | Dec. 5, 1939 |
| 2,415,887 | Jay | Feb. 18, 1947 |
| 2,443,332 | Summers | June 15, 1948 |
| 2,509,436 | Isenbarger | May 30, 1950 |
| 2,547,185 | Von Bolhar | Apr. 3, 1951 |
| 2,639,198 | Kirkham | May 19, 1953 |
| 2,656,820 | Becker | Oct. 27, 1953 |